United States Patent
Bannon et al.

(10) Patent No.: US 10,416,899 B2
(45) Date of Patent: Sep. 17, 2019

(54) SYSTEMS AND METHODS FOR LOW LATENCY HARDWARE MEMORY MANAGEMENT

(71) Applicant: Tesla, Inc., Palo Alto, CA (US)

(72) Inventors: Peter Joseph Bannon, Woodside, CA (US); Kevin Altair Hurd, Redwood City, CA (US); Emil Talpes, San Mateo, CA (US)

(73) Assignee: Tesla, Inc., Palo Alto, CA (US)

( * ) Notice: Subject to any disclaimer, the term of this patent is extended or adjusted under 35 U.S.C. 154(b) by 0 days.

(21) Appl. No.: 16/000,248

(22) Filed: Jun. 5, 2018

(65) Prior Publication Data
US 2019/0250830 A1  Aug. 15, 2019

Related U.S. Application Data

(60) Provisional application No. 62/630,096, filed on Feb. 13, 2018.

(51) Int. Cl.
*G06F 12/00* (2006.01)
*G06F 3/06* (2006.01)
*G06F 12/02* (2006.01)

(52) U.S. Cl.
CPC .......... *G06F 3/0611* (2013.01); *G06F 3/064* (2013.01); *G06F 3/0673* (2013.01); *G06F 12/0246* (2013.01)

(58) Field of Classification Search
CPC ...... G06F 3/0611; G06F 3/064; G06F 3/0673; G06F 12/246
See application file for complete search history.

(56) References Cited

U.S. PATENT DOCUMENTS

| | | | |
|---|---|---|---|
| 2004/0073746 A1* | 4/2004 | Fallon | H04N 9/8042 711/111 |
| 2008/0222380 A1 | 9/2008 | Sze et al. | |
| 2013/0111188 A9 | 5/2013 | Vorbach et al. | |
| 2015/0310087 A1* | 10/2015 | Tidwell | G06F 16/258 713/189 |

(Continued)

OTHER PUBLICATIONS

Written Opinion of the International Searching Authority, dated Apr. 29, 2019, in International Patent Application No. PCT/US2019/017472, filed Feb. 11, 2019 (7 pgs).

(Continued)

*Primary Examiner* — Shawn X Gu
(74) *Attorney, Agent, or Firm* — North Weber & Baugh LLP

(57) ABSTRACT

In various embodiment, the present invention teaches a sequencer that identifies an address point of a first data block within a memory and a length of data that comprises that data block and is related to an input of a matrix processor. The sequencer then calculates, based on the block length, the input length, and a memory map, a block count representative of a number of data blocks that are to be retrieved from the memory. Using the address pointer, the sequencer may retrieve a number of data blocks from the memory in a number of cycles that depends on whether the data blocks are contiguous. In embodiments, based on the length of data, a formatter then maps the data blocks to the input of the matrix processor.

20 Claims, 4 Drawing Sheets

(56) References Cited

U.S. PATENT DOCUMENTS

2015/0347026 A1* 12/2015 Thomas ............... G06F 3/0611
                                                        711/103
2016/0342891 A1* 11/2016 Ross ................... G06F 15/8046

OTHER PUBLICATIONS

International Search Report, dated Apr. 29, 2019, in International Patent Application No. PCT/US2019/017472, filed Feb. 11, 2019 (2 pgs).
Gog et al. "Optimized succinct data structures for massive data." In: Software—Practice and Experience, May 23, 2013. Available from the Internet, <URL: https://people.eng.unimelb.edu.au/sgog/optimized.pdf>, entire document (28 pgs).

* cited by examiner

SYSTEMS AND METHODS FOR LOW LATENCY HARDWARE MEMORY MANAGEMENT

CROSS-REFERENCE TO RELATED APPLICATIONS

This application claims the priority benefit under 35 USC § 119(e) to U.S. Patent Application No. 62/630,096, filed on Feb. 13, 2018, entitled "Systems and Methods for Low Latency Hardware Memory Management," listing as inventors Peter Joseph Bannon, Kevin Altair Hurd, and Emil Talpes, which application is incorporated by reference herein in its entirety and for all purposes.

BACKGROUND

Technical Field

The present disclosure relates to improved memory read operations, and more particularly, relates to efficient memory management methods and systems that align data retrieval from memory to characteristics of hardware-accelerated processing devices.

Description of the Related Art

One skilled in the art will recognize the importance of high-speed data retrieval from memory when using hardware-accelerated processors. Hardware-accelerated processing systems enable the analysis of data within time-sensitive applications such as autonomous driving, security and user authentication processes and other technologies known to one of skill in the art. In designing these systems, it is important that data retrieved from memory is done at a sufficient speed so that a hardware-accelerated processor does not have to wait for an extended period of time for this new data. In many instances, traditional memory architectures and methods may cause of bottleneck in the accelerated systems due to the time required to process and implement read requests.

FIG. 1 shows an ordinary memory management system as is known in the art. System 100 comprises Central Processing Unit (CPU) 104 that is typically implemented on a monolithic chip of a general-purpose computer system, controller 106, and memory 110. CPU 104 is an ordinary processor that receives and processes image data 102. Image data 102 is typically a file that contains a relatively large number of pixels that are represented as binary numbers and processed in groups or blocks of data 114.

Memory 110 is a physical memory device, e.g., a random access memory (RAM), that is designed to store digital data. Memory 110 contains individual data storage locations 114 that are accessed using, e.g., hardware-specific protocols, that define and index physical addresses in the memory address spacey memory 110, such that different architectures oftentimes store image data 102 inefficiently within memory and require multiple clock cycles in retrieving this data.

In operation, memory controller 106, in response to receiving a write command by CPU 104, divides image data 102 into individual portions 114 that can be stored at various individual storage locations, which may be grouped in blocks that may be scattered within memory 110. The storage locations are typically based on the architecture of memory 110, any pre-existing data that has previously been stored in memory 110, the amount of data that is stored, and other circumstances. The various locations 114 are each associated with memory addresses within memory 110.

Storing image data 102 in memory 110 typically requires the use of a relatively large number of pointers 124 that demark physical memory addresses, e.g., in integer multiples of a certain byte size. Each pointer 114 may indicate a particular memory block 124 or a location within a memory block 124 for storing a portion of image data 102 within memory 110. Memory controller 106 allocates pointers 124 corresponding to different portions of image 102 to memory locations 114, thereby, dividing a single image into smaller chunks of data that are then distributed across various locations within memory 110. For example, based on a first pointer 124 a first block 114 is read, based on a second pointer 126 a second block 116 is read, and so on, until the complete image data 102 is written and stored into memory 110.

This prior art memory architecture and data retrieval method may result in wait times that unnecessarily slow down the processing system. Similarly, if, subsequently, it is desired to access and retrieve or restore the image from memory 110, each pointer 114 will have to be processed, such that individual blocks 114 can be read out and reassembled to rebuild the complete image from image data 102.

Accordingly, what is needed are systems and methods that allow for efficient memory management that reduces data latency and, thus, data management cost and power consumption.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
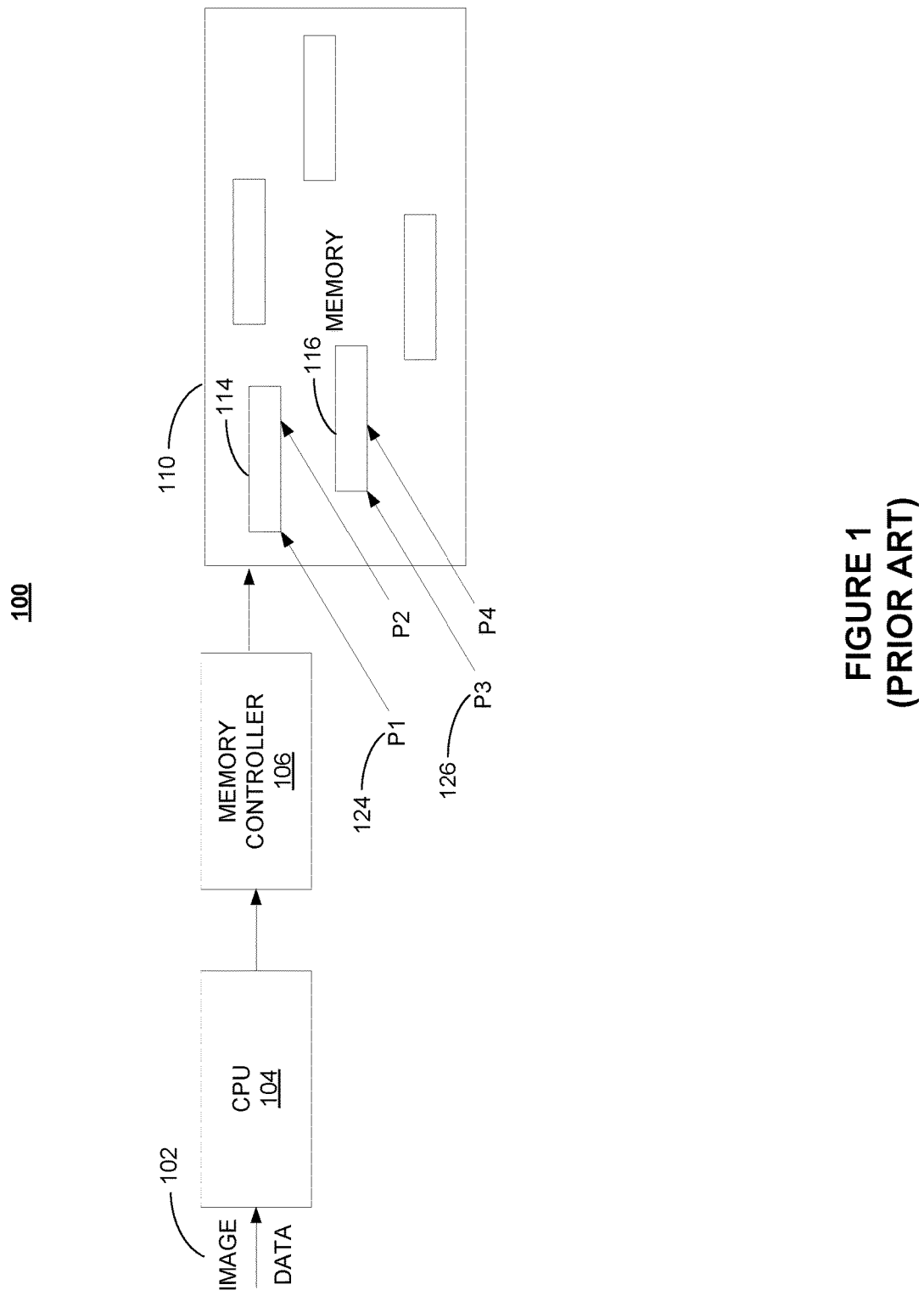
FIG. 1 shows an ordinary memory management system as is known in the art.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

Furthermore, it shall be noted that embodiments described herein are given in the context of secure microcontrollers, but one skilled in the art shall recognize that the teachings of the present disclosure are not limited to any type of microcontroller and may equally be may be of interest to any software provider who wants to use IP protection services in other contexts and applications.

In this document the term "non-volatile memory" refers to an electrical data storage device (e.g., flash memory) that retains its state after power is removed. The terms "physical memory" refers to an electrical data storage device that enables memory writes and reads, as opposed to virtual or logical memory that is defined by software or a processor. The terms "processor" and "microcontroller" are used interchangeably and refer to an electric circuit that performs one or more data processing and/or control operations. Similarly, the terms "buffer" and "memory" refer to regions physical memory that may include one or more storage locations addressable by a physical address. As used herein, the term "pointer" refers to the beginning of a physical address in a memory device.

According to various embodiments of the invention, a hardware-accelerated processing system stores data within memory in a particular pattern to reduce latency of read operations. In certain embodiments, an image file is partitioned into fixed block lengths that relate to one or more input lengths of an accelerated processor (e.g., a matrix processor) and/or other characteristics of the system. If the system is performing convolution operations, this fixed block length may relate to convolution block size, stride length, number of channels and other convolution parameters known to one of skill in the art. This method of storing data allows the system to retrieve blocks of data from memory with a reduced number of pointers and corresponding clock cycles. Ideally, a data block that will be input into a matrix processor is retrieved using a single pointer. However, there may be instances in which multiple clock cycles are used to retrieve data depending on whether the data is contiguous within memory, the particular data needed within the matrix processor input, etc. The system is able to reduce latency of memory reads by better aligning the size and location of data blocks within memory to the particular characteristics of the accelerated processor used to operate on the data.

Figure 2:
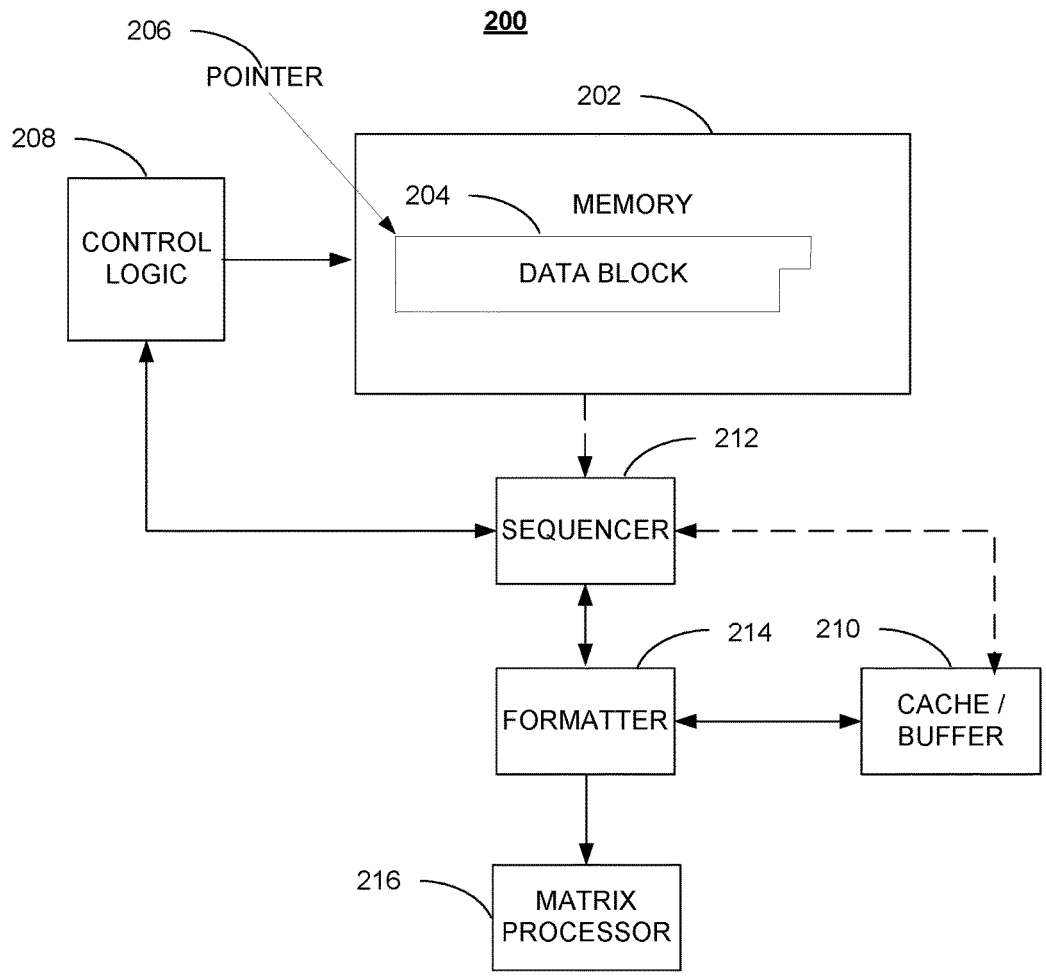
FIG. 2 illustrates a memory management system for mapping data from a memory to a matrix processor, according to various embodiments of the present disclosure.

FIG. 2 illustrates a memory management system for mapping data from a memory to a hardware-accelerated processor, such as a matrix processor, according to various embodiments of the present disclosure. System 200 represents components of a special-purpose computer system that is designed to perform specific operations in accordance with the hardware requirements of a hardware-accelerated processor. In embodiments, system 200 comprises memory 202, control logic 208, sequencer 212, formatter 214, cache or buffer 210, and matrix processor 216. One skilled in the art will understand that the matrix processor 216 is representative of various different hardware-accelerated processors that are applicable to various embodiments of the present disclosure.

Memory 202 may be any type of memory known in the art, e.g., SRAM, that stores data block(s) 204. The memory 202 may store data in accordance with a controller in which data is mapped across the memory using a virtual memory map. This virtualization results in a more efficient way to map data stored internally within memory 202. Sequencer 212 may comprise components for storing and/or interfacing with a virtualized memory map, a block size-to-vector aligner, and a block count-to-data structure calculator as will be discussed in greater detail with reference to FIG. 3. The sequencer 212 may interface with the memory 202, the cache/buffer 210 or a combination thereof.

It is understood that one of more functions performed by one of the components in system 200 in FIG. 2 may be shared or performed by other components. For example, one or more functions of sequencer 212 and formatter 214 may be integrated into a single component, or the virtualized memory map may be stored in controller 208 and/or sequencer 212.

In operation, data memory 202 stores data blocks 204 that that each may have a fixed size and, in embodiments, represent a two-dimensional (2D) or three-dimensional (3D) data structure associated with an image. In embodiments, data block 204 may be stored in memory 202 as contiguous data in a number of rows (either virtually or actual), starting at an initial memory address that is associated with address pointer 206. The size of data block 204 may vary, be programmable and, in embodiments, be determined by conversion parameters, such a stride, a shape (e.g., rows and columns), a number of channels, and the like, which relate to the hardware-accelerated system.

In embodiments, the memory addresses at which data blocks 204 are stored in memory 202 may depend on the architecture of memory 202 and the size of each image. For example, memory 202 may use virtual memory techniques to store data block 204 (and by extension, image data) in consecutive virtual addresses in defined, e.g., distributed, memory locations.

In embodiments, data representing, e.g., a collection of points in an image, may be retrieved from memory 202 in one or more cycles, e.g., in order to aid in assembling image data. In embodiments, data blocks 204 that are contiguous in memory 202 may be retrieved at once, e.g., in a single cycle beginning at the address determined by pointer 206 because the system is able to map contiguous data blocks to the single pointer using the fixed lengths of the blocks to identify an end address. Conversely, if data blocks 204 or the data therein are not contiguous, they may be retrieved in two or more cycles, by generating, for each subsequent cycle, a new address (with corresponding pointer) at which a fixed amount of data from another data block 204 may be retrieved.

Because the starting point and the size of data blocks 204 is known, one can compute, e.g., by using sequencer 212, the locations at which subsequent data blocks 204 begin and end. Sequencer 212 may ascertain end points for particular read requests based on the number of rows and columns of an image and the manner in which the data was stored. In embodiments, end points may be inferred or computed, e.g., from constants such as the number of rows and columns of the 2D structure, or by using any number of parameters. This pre-determined data storage architecture allows data to be stored in memory based on certain characteristics of the system so that a more efficient, timely retrieval procedure may be implemented.

In embodiments, control logic 208 may provide sequencer 212 with a set of such parameters that may define a set of fixed data blocks 204 that may each be identified by a dedicated pointer (not shown) that indicates a certain address in memory 202. In embodiments, sequencer 212, receives from control logic 208, convolution instructions that comprise a number of convolution parameters that may be stored, e.g., in base registers. The convolution instructions may comprise filter parameters, such as a filter size, stride lengths, the number of outputs channels, etc. In embodiments, sequencer 212 uses the convolution parameters to identify inputs or addresses of inputs of a convolution operation and fetches data from corresponding address locations in memory 202.

In embodiments, formatter 214 may linearize some or all of the data retrieved from memory 202, by converting 2D or 3D data into a single vector or string that may be represented by a row or column, thereby, linearizing or vectorizing the data. In embodiments, formatter 214 prepares image data in memory 202 for processing by matrix processor 216 by mapping, according to convolution parameters, image data into a suitable format according to the hardware requirements of matrix processor 216 such that matrix processor 216 can perform a matrix multiplication as part of a convolution calculation, e.g., to generate output pixels.

In embodiments, data formatter 216 identifies, e.g., via a state machine, inputs that are overlapping, i.e., identical or redundant, and may exists in one or more locations that would have to be accessed twice or more for a given convolution operation. The state machine may be configured to use filter parameters, such as a filter size and a stride to identify the overlapping data as reusable data, such that matrix processor 216 may reuse operands without having to re-access and transfer data from a memory 202. Instead, in embodiments, the reusable data may be loaded from local copies stored, e.g., in cache 210, thereby, reducing computational efforts, time, and power consumption. If data is retrieved from memory 202, the system attempts to retrieve this data as quickly as possible by reducing the number of pointers used to read the data required for input within the matrix processor 216.

In embodiments, data sequencer 212 may, e.g., for each convolution operation, arrange the retrieved inputs according to positions expected by matrix processor 216 in each cycle of a convolution operation, e.g., to match a given input format of matrix processor 216 when carrying out a dot multiplication. Sequencer 212 may generate addresses for reading data, write the results, and keep track of the state of system 200 when performing a convolution operation. In embodiments, sequencer 212 uses some or all of this information to determine from which addresses within memory 202 to obtain data and how to process it in a manner such that it can be properly used by matrix processor 216, e.g., in a subsequent convolution step. In embodiments, sequencer 212 is coupled to data formatter 214 that aligns the retrieved and synchronized image data with matrix processor 216 in a predefined order according to the given input format.

In embodiments, formatter 214 determines whether the retrieved data contains sufficient data to feed matrix processor 216 in a given cycle and, if not, formatter 214 may instruct matrix processor 216 to wait, e.g., for one cycle, to receive the additional data. In embodiments, formatter 214 may instruct sequencer 212 to identify a new address pointer to perform an additional read operation to fetch from memory 202 a new batch of data to obtain additional data that can be provided to matrix processor 216. In this way, while memory device 202 may be able to process a single read operation in any given cycle, sequencer 212 may process a read operation over any number of cycles before passing the data to matrix processor 216. In embodiments, prior to making the data available to matrix processor 216, formatter 214 processes the data, e.g., by filtering it according to a set of hardware requirements of matrix processor 216. For example, formatter 214 may output data having a block length that is aligned with the input of matrix processor 216.

In convolution applications, instead of a GPU waiting for a host (e.g., CPU) to send one instruction at a time to perform a single step of a convolution, a sequencer 212 aligns data for parallel processing such that an entire convolution may be performed in a single step. The data used in this paralleled and pipelined processor is read based on the size of the data path as well as the characteristics of the convolution operations. In embodiments, the system uses a single pointer and pre-determined size of data blocks, to retrieve the appropriate data to be aligned to the matrix processor in a reduced number of clock cycles. In so doing, the system identifies an end address of the data to be retrieved by aligning the pointer 206 and the number of fixed-length blocks to the read request. In other words, an image may be read without having to read each data block, ascertain the next pointer in order to read the next block, and so on.

In certain embodiments, a data block 206 is retrieved from either memory 202 or cache/buffer 210 in which only certain sub-blocks are desired for input into the formatter 214. In this scenario, the sequencer 212 generates a mask of the retrieved block in which relevant sub-blocks are identified therein. As a result, these sub-blocks may be extracted from the data block and provided to the formatter 214.

Figure 3:
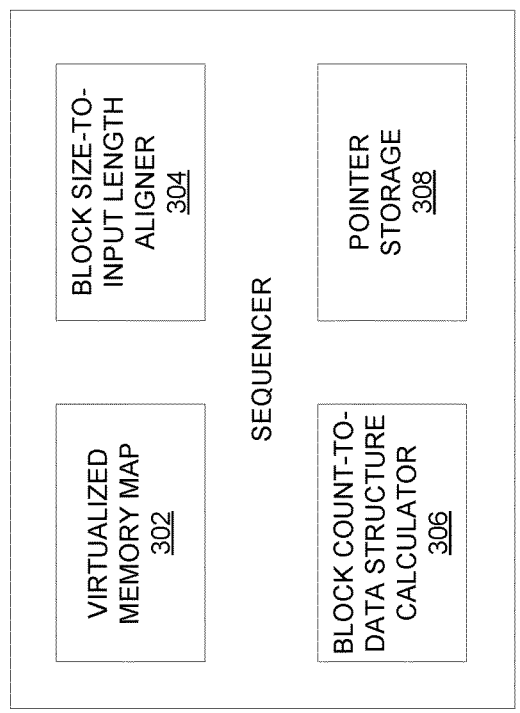
FIG. 3 illustrates a sequencer according to various embodiments of the present disclosure.

FIG. 3 illustrates a sequencer according to various embodiments of the present disclosure. System 300 comprises virtualized memory map 302, block size-to-input length aligner 304, block count-to-data structure calculator 306, and pointer storage 308. In embodiments, sequencer 300 may be programmable and comprise different or additional components to accomplish the goal of the present invention. For example, sequencer 300 may comprise a state machine that fetches data from a memory and marks the availability of the data, e.g., by using a single bus register. Also, the memory map 302 and/or pointer storage 308 may be implemented in a memory controller.

In embodiments, sequencer 300 may, e.g., for a convolution operation, use block size-to-input length aligner 304 to identify and align the data to be read from memory to the formatter which will vectorize this data into the input of the accelerated processor. This alignment may take into account the vector length of the input, the specific data that is redundant from prior operations (and in some instances cached locally) and other parameters that ensure a read request identifies the appropriate data. The block size-to-input length aligner 304 may also identify a pointer corresponding to the initial bit of this read request. In so doing, the block size-to-input length aligner 304 may communicate with pointer storage 308 that stores a plurality of pointers for data stored in a manner consistent with the description above.

The block count-to-data structure calculator 306 identifies an end address corresponding to the read request. In so doing, the end address is calculated using the specific length of blocks contiguously stored within the memory and the length of the read request. As previously described, if a read request may be satisfied with a set of contiguously stored data blocks, then the request may be retrieved using a single clock cycle. However, if the corresponding data is stored in a non-contiguous manner, then multiple clock cycles and pointers are used to retrieve the data. The block count-to-data structure calculator may communicate with the virtualized memory map 302 (located within the sequencer or memory controller) to determine whether appropriate blocks are contiguous or not.

One skilled in the art will recognize that the sequencer 300 may be a discrete device or integrated with other components. Additionally, one skilled in the art will recognize that components within the sequencer may be distributed across other components such as the memory controller 208 or formatter 214.

Figure 4:
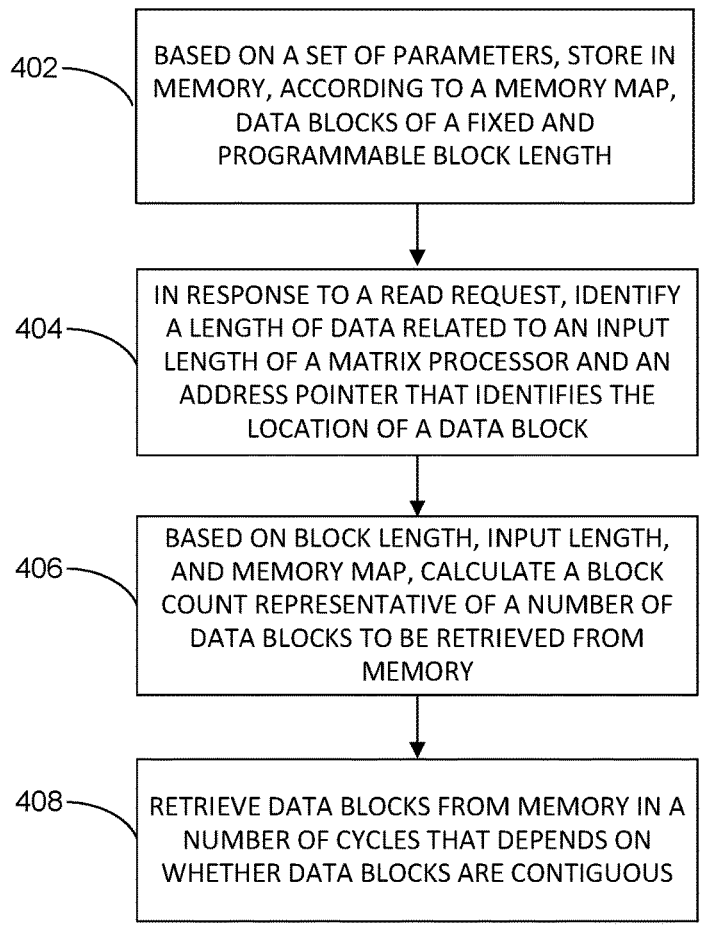
FIG. 4 is a flowchart of an illustrative process for managing memory according to various embodiments of the present disclosure.

FIG. 4 is a flowchart of an illustrative process for managing memory according to various embodiments of the present disclosure. Process 400 begins when, at step 402, based on a set of parameters, data blocks of a fixed and programmable block length are stored in a memory, according to a memory map. In embodiments, parameters, may comprise convolution parameters, such convolution block size, stride, and number of channels such that a preferred block length is identified for storing data in memory.

At step 404, in response to a read request, a length of data that is related to the request and an address pointer are identified. In embodiments, the address pointer identifies the initial location of a first data block in the memory corresponding to the read request.

At step 406, based on the block length, the input length, and/or the memory map, a block count, representative of a number of data blocks to be retrieved from memory, is calculated to satisfy the read request. As previously described, if the data blocks identified in the count are stored contiguously, then the read request may be executed in a single clock cycle. If the data blocks are distributed, then multiple clock cycles will be required.

Finally, at step 408, data blocks are retrieved from memory in one or more cycles, the number of which may depend on whether data blocks, or the data in the data blocks, are contiguous.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It shall be noted that elements of the claims, below, may be arranged differently including having multiple dependencies, configurations, and combinations. For example, in embodiments, the subject matter of various claims may be combined with other claims.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A method for retrieving data within a hardware-accelerated processing system, the method comprising:
storing a data file within memory in accordance with a defined procedure relating to at least one parameter of the hardware-accelerated processing system, the data file being partitioned into a plurality of fixed-length blocks with corresponding plurality of address pointers;
generating a memory map that identifies the plurality of fixed-length blocks, within the plurality of fixed-length blocks, that are stored contiguously;
in response to a read request, identifying:
a length of data that is related to the length of an input into a hardware-accelerated processor; and
an address pointer that identifies within the memory a first data block for the read request;
based on at least one of block length, the length of data, and the memory map, calculating a block count and a mask that is representative of a number of data blocks that are to be retrieved for the read request; and
using the address pointer to retrieve one or more data blocks from the memory.

2. The method according to claim 1 wherein the hardware-accelerated processor is a matrix processor.

3. The method according to claim 1 further comprising the step of mapping the one or more data blocks to the input of the hardware-accelerated processor such that the one or more data blocks are in a multi-dimensional format and the input is one-dimensional.

4. The method according to claim 1 wherein each fixed-length block relates to the length of the input of the hardware-accelerated processor.

5. The method according to claim 1 wherein the read request corresponds to a first set of fixed-length data blocks that are stored contiguously and are read using a single initial address pointer.

6. The method according to claim 5 wherein the read request is performed in a single clock cycle.

7. The method according to claim 1 wherein the length of the input of the hardware-accelerated processor is an integer multiple of a fixed-length data block.

8. The method according to claim 1 further comprising the step of calculating an ending address associated with the plurality of fixed-length data blocks corresponding to the read request.

9. The method according to claim 8 wherein the ending address is calculated using the address pointer of the first data block and length of the fixed-length data blocks.

10. A system for mapping data from a memory to a hardware-accelerated processing system, the system comprising:
a memory that stores a data file in accordance with a defined procedure relating to at least one parameter of the hardware-accelerated processing system, the data file being partitioned into a plurality of fixed-length data blocks with corresponding plurality of address pointers;
a controller coupled to the memory, the controller configured to store data in accordance with the defined procedure and generate a virtualized map of the stored data;
a sequencer coupled to the memory, the sequencer, in response recovering to a read request, performs the steps of:
identifying a length of data that is related to a length of an input into a hardware-accelerated processor and an address pointer that identifies within the memory a first data block for the read request;
calculating, based on a length of the plurality of fixed-length data blocks, the address pointer, and a memory map, a block count that is representative of a number of data blocks that are to be retrieved from the memory; and
retrieving a subset of the plurality of fixed-length data blocks corresponding to the read request.

11. The system according to claim 10 further comprising a formatter coupled to the sequencer, the formatter maps, based on the length of data, the plurality of fixed-length data blocks retrieved from memory to a one-dimensional input of the hardware-accelerated processor.

12. The system according to claim 11 wherein the hardware-accelerated processor is a matrix processor.

13. The system according to claim 10 further comprising a cache coupled to the formatter, the cache configured to store data that is redundant across multiple operations of the hardware-accelerated processor.

14. The system according to claim 10 wherein a virtual map of the memory is stored in the sequencer or the controller.

15. The system according to claim 10 wherein the plurality of fixed-length of data blocks relates to the length of the input of the hardware-accelerated processor.

16. The system according to claim 10 wherein the read request corresponds to a first set of the plurality of fixed-length data blocks that are stored contiguously and are read using a single initial address pointer.

17. The system according to claim 16 wherein the read request is performed in a single clock cycle.

18. The system according to claim 10 further comprising the step of calculating an ending address associated with the plurality of fixed-length data blocks corresponding to the read request.

19. A system for accelerating data processing, the system comprising:
a memory that stores a plurality of data files in accordance with a defined procedure relating to at least one parameter of the hardware-accelerated processing system;
a controller coupled to the memory, the controller configured to store data in accordance with the defined procedure and generate a virtualized map of the stored data;
a sequencer coupled to the memory, the sequencer configured to generate a read request relating to data block to be input into a multi-dimensional matrix processor, the input being one-dimensional and having a first length;
a formatter coupled to the sequencer, the formatter converts a plurality of data blocks retrieved from the memory into a one-dimensional vector having the first length; and
the multi-dimensional matrix processor that performs a plurality of mathematical operations on a first set of data input in a first direction and a second set of data input in a second direction.

20. The system of claim 19 wherein the memory stores a plurality of data blocks in fixed-length data blocks having a relationship to an input length of at least one input of the multi-dimensional matrix processor.

* * * * *